March 10, 1964 P. E. VESILIND 3,123,860
EXTRUDER SCREW
Filed Sept. 15, 1961
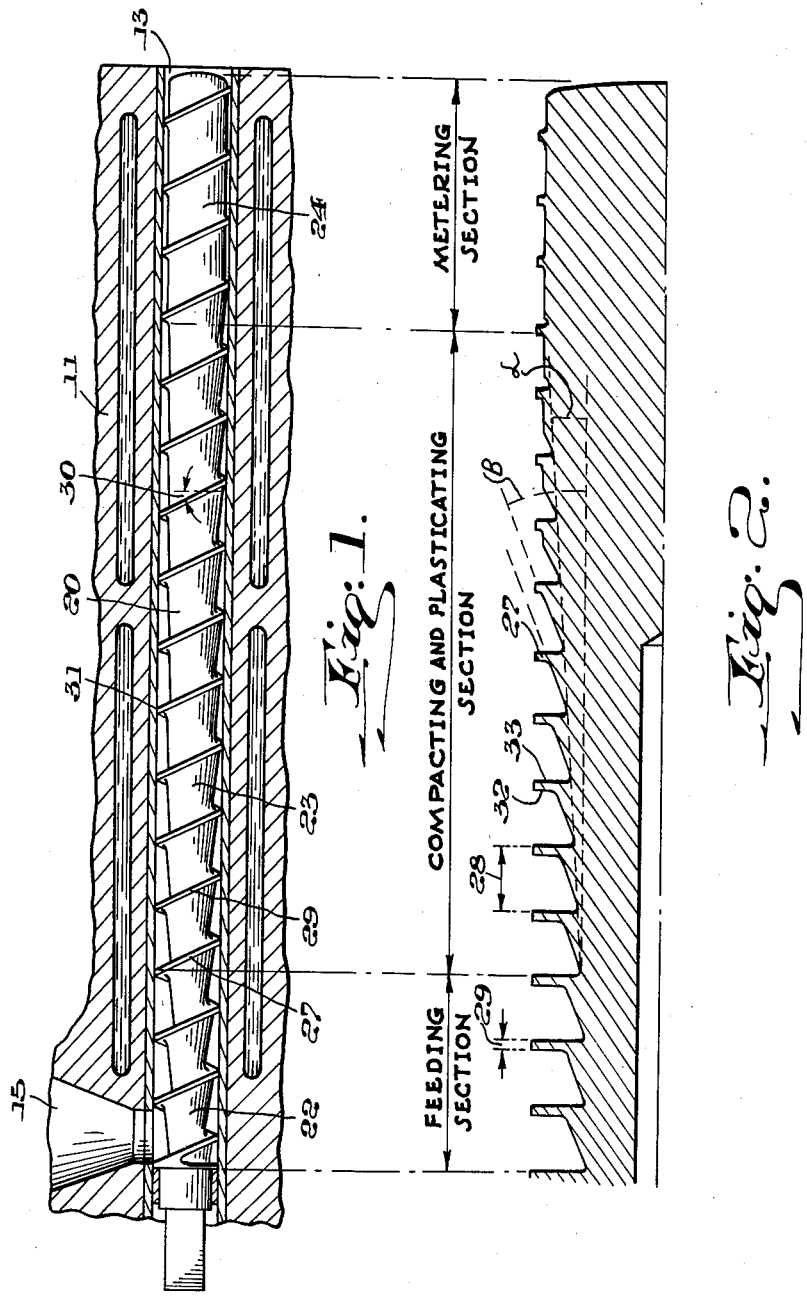
INVENTOR.
PAUL E. VESILIND.
BY Oscar B. Crumback.
his ATTORNEY.

3,123,860
EXTRUDER SCREW
Paul E. Vesilind, Beaver, Pa., assignor to Koppers Company, Inc., a corporation of Delaware
Filed Sept. 15, 1961, Ser. No. 138,374
2 Claims. (Cl. 18—12)

This invention relates generally to extrusion apparatus for plastic material and, more particularly, to a novel screw for use in extrusion apparatus.

Plastic extrusion consists generally of feeding a thermoplastic polymer, which is usually in the nature of a dry particulate material, through a cylinder where the material is softened to a molten mass, and then forced through a die as an extrudate of desired shape. Thus, the cylinder is usually provided at one end with a hopper and at the other end with a die. A screw, mounted for rotation in the cylinder, receives the plastic particles from the hopper and forces the plastic material along the barrel and through the die. Heat supplied from the barrel and generated by the working of the screw causes the plastic material to become molten and to flow through the die from whence the plastic issues as a strip having the desired cross-sectional configuration.

The action of the screw in addition to flowing the polymeric material through the cylinder also effects two general types of mixing. First, the flights of the screw, by continuously scraping the inside wall of the barrel and tumbling the material over and over in the general direction of the screw axis, imparts a physical type of mixing or blending to the particles. This type of mixing occurs to the greatest extent in deep flighted screws. The circulating flow is confined to the rear portion of the channel in each turn, the forward portion being filled largely with unfluxed material. The width of the flux and circulating band gradually increases from the entrance toward the exit end of the screw.

A second type of mixing that occurs to the greatest extent in shallow flighted screws is a shearing type of mixing. The particles become subjected to shearing action between the root of the screw and a thin film of molten material along the barrel; the particles are then smeared around the barrel in a direction perpendicular to the screw axis until they meet the leading edge of the advancing flight and are mixed with previously molten material and forced downwardly into the channel between the flights, thereby starting a helical circulating path.

Extruder screws having shallow channel depth impart both mixing actions, tumbling and shearing. The flight edge tumbles the material over and over, and the close clearance between the root of the screw and barrel inside wall shears the material. These shallow channeled extruder screws homogenize material well, but they have a low output rate.

Extruder screws having deep channels give higher outputs, but they impart only one mixing action, tumbling. With only one mixing action, the material must be held in the extruder for a longer time in order to get good homogenizing. This means that longer and more expensive extrusion equipment must be used.

This invention overcomes the foregoing shortcomings by providing a novel screw whose channels decrease in depth along the length of the flight. The channels of the novel screw tilt upwardly within the flights in the direction of travel of the material which permits both mixing actions along the entire screw without detracting from the extrusion effectiveness of the screw and without lengthening a normal extruder for good homogenizing.

The above and further objects and novel features of this invention will appear more fully from the detailed description when the same is read in conjunction with the accompanying drawing. It is to be expressly understood, however, that the drawing is not intended to be a definition of invention but is for the purpose of illustration only.

In the drawing wherein like parts are marked alike:

FIGURE 1 illustrates an extrusion machine in cross-section with an embodiment of a screw, shown in exaggerated fashion, made in accordance with this invention; and FIGURE 2 is a partial cross-section of the screw of FIGURE 1.

Extrusion machines are common and are made by a number of manufacturers. The machine, illustrated in FIGURE 1, includes a heated extrusion cylinder 11 that has a bore 13 of uniform diameter. A hopper 15 at the entrance end permits granular plastic material to be fed into bore 13, and a suitable die of desired configuration (not shown) at the other end permits the plastic to be extruded with the desired shape. Rotatably mounted in a conventional fashion within bore 13 is an embodiment of screw 20 of this invention.

Screw 20 may be conveniently considered as having a portion 22 for receiving the material from the hopper and feeding it into cylinder 13, a portion 23 for compacting and plasticating the material, and a portion 24 for metering the molten mass into the extrusion die. As illustrated herein, screw 20 has a single flight 27 traveling along the screw with flight-lands 29 of constant width and with constant pitch 28 and a constant helix angle 30. The clearance 31 between the flight-lands 29, and the bore 13 of the cylinder is maintained at a constant value. The sides 32 and 33 of the flights are maintained normal to the axis, i.e., flat.

In accordance with this invention, the channels between the screw flights are formed by grooves whose bottom portion slants upwardly from the entrance to the exit portions along the screw. The channels are maintained at constant value in the feeding portion 22 of screw 20, thereby providing a constant root portion for the section. The channels are also maintained at constant value or cross-sectional flow area in the metering section 24 of the screw, thereby providing a constant root portion for this section. However, the root of section 22 differs from the root of section 24. The root of compacting and plasticating section 23, however, varies; the root tapering at a constant rate denoted as angle $\alpha$ from the feeding section 22 to the metering section 24. In addition the channel turns upwardly at a constant angle denoted as $\beta$ in feeding section 22 and compacting and plasticating section 24. Thus, the grooves become shallower from the entrance end to the discharge end of the screw along its length. Additionally, the junction of a groove and a thread are rounded or filleted to increase the circulating action of the material and decrease the driving force for the the screw.

As an example of this invention, an 18:1 length to diameter ratio extruder having a constant bore of 6.000 inches diameter is provided with a screw whose threads have an outside flight diameter of 5.986 inches and a pitch of 6.000 inches. The feeding section of the screw is 18 inches in length; the compacting and plasticating section is 72 inches; and the metering section is 16.125 inches. The first groove slants upwardly at an angle of 5 degrees and 15 minutes and varies in depth from 1.250 inches at the rear to 0.750 inch at the front. Each groove in the feeding section is identical. Thereafter, each of the grooves in the compacting and plasticating section intersect a base line extending upwardly at an angle of 52 minutes and 40 seconds, and each groove slants upwardly at this angle of 5 degrees and 15 minutes. The junction of the angle and the flat face of the thread is rounded with fillets having a radius of .125 inch. When such a screw is driven at a rate of 82 revolutions per minute, it is capable of extruding polystyrene with a viscosity of 0.1 lb.-sec. per square inch at 450° F. at the rate of 1000 pounds per hour.

The foregoing has described a novel extrusion apparatus which provides for a high rate of extrusion and yet accomplishes both physical blending and shearing action of the particles, so as to provide an output which is homogeneous.

It is claimed:

1. An extruding apparatus which comprises an extrusion cylinder having a bore of uniform diameter, a screw rotably mounted within said bore and having a feeding section, a compacting and plasticating section and a metering section, said screw having grooves cut therein to provide a single thread extending helically around the axis of the screw, the groove having a bottom portion extending upwardly from the front face of one thread to the rear face of the next thread at a constant angle relative to the axis of the screw to provide a channel which becomes progressively shallower, the cross-sectional flow area of said channel being constant in the feeding section but progressively decreasing in the compacting and plasticating section at a constant angle relative to the axis of the screw along the length of said section, and the cross-sectional flow area being constant in the metering section.

2. A screw for an extruder comprising a feeding section, a compacting and plasticating section and a metering section, said screw having a thread proceeding along the length of the screw at a constant helix angle, said thread in said feeding section having a root which angles upwardly from an initial diameter to a larger diameter at the screw face, the initial root values for each thread in the feeding section being identical, the thread in the compacting and plasticating section also having a root which angles upwardly from an initial diameter to a larger terminal diameter, said angle being of the same value, the initial diameter also increases at a constant angle axially through the length of the compacting and plasticating section, and the root in the metering section being constant.

References Cited in the file of this patent

UNITED STATES PATENTS

| | | |
|---|---|---|
| 2,622,469 | Gray | Dec. 23, 1952 |
| 2,702,410 | Brown | Feb. 22, 1955 |
| 2,705,343 | Hendry | Apr. 5, 1955 |
| 2,872,703 | Gambrill et al. | Feb. 10, 1959 |
| 3,078,514 | Gray | Feb. 26, 1963 |

OTHER REFERENCES

S.P.E. Journal, March 1954, pp. 22 et seq., "Adiabatic," McKelvey and Bernhardt.

Modern Plastic, April 1953, "Plastic Flow Paths in an Extruder Worm," Street.

Monsanto Bulletin No. 1029, Copyright 1956, "Fundamentals of Thermoplastic Extrusion."